US011625882B2

(12) United States Patent
Stomakhin et al.

(10) Patent No.: US 11,625,882 B2
(45) Date of Patent: Apr. 11, 2023

(54) METHOD FOR SIMULATING FLUIDS INTERACTING WITH SUBMERGED POROUS MATERIALS

(71) Applicant: Unity Technologies SF, San Francisco, CA (US)

(72) Inventors: Alexey Stomakhin, Waimanalo, HI (US); Joel Wretborn, Wellington (NZ); Gilles Daviet, Mûres (FR)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/523,317

(22) Filed: Nov. 10, 2021

(65) Prior Publication Data

US 2022/0068002 A1 Mar. 3, 2022

Related U.S. Application Data

(63) Continuation of application No. 17/184,299, filed on Feb. 24, 2021.
(Continued)

(51) Int. Cl.
*G06T 15/00* (2011.01)
*G06T 13/60* (2011.01)
(Continued)

(52) U.S. Cl.
CPC .............. *G06T 13/60* (2013.01); *G06T 7/251* (2017.01); *G06T 7/62* (2017.01); *G06T 13/40* (2013.01);
(Continued)

(58) Field of Classification Search
CPC .......... G06T 13/00; G06T 13/20; G01N 15/00
(Continued)

(56) References Cited

U.S. PATENT DOCUMENTS 5,563,613 A 10/1996 Schroeder et al.
6,814,482 B2 11/2004 Meyer et al.
(Continued)

OTHER PUBLICATIONS

Braley C, Sandu A. Fluid simulation for computer graphics: A tutorial in grid based and particle based methods. Virginia Tech, Blacksburg. 2010.*
(Continued)

*Primary Examiner* — Phu K Nguyen
(74) *Attorney, Agent, or Firm* — Haynes and Boone LLP

(57) ABSTRACT

A method for generating one or more visual representations of a porous media submerged in a fluid is provided. The method can be performed using a computing device operated by a computer user or artist. The method includes defining a field comprising fluid parameter values for the fluid, the fluid parameter values comprising fluid velocity values and pore pressures. The method includes generating a plurality of particles that model a plurality of objects of the porous media, the plurality of objects being independently movable with respect to one another, determining values of motion parameters based at least in part on the field when the plurality of particles are submerged in the fluid, buoyancy and drag forces being used to determine relative motion of the plurality of particles and the fluid, and generating the one or more visual representations of the plurality of objects submerged in the fluid based on the values of the motion parameters.

17 Claims, 6 Drawing Sheets

Related U.S. Application Data

(60) Provisional application No. 62/983,250, filed on Feb. 28, 2020.

(51) Int. Cl.
  *G06T 13/80* (2011.01)
  *G06T 13/40* (2011.01)
  *G06T 7/246* (2017.01)
  *G06T 7/62* (2017.01)

(52) U.S. Cl.
  CPC .......... *G06T 13/80* (2013.01); *G06T 2210/16* (2013.01); *G06T 2210/24* (2013.01)

(58) Field of Classification Search
  USPC ........................................................ 345/418
  See application file for complete search history.

(56) References Cited

U.S. PATENT DOCUMENTS

| | | | |
|---|---|---|---|
| 7,239,990 | B2 | 7/2007 | Strujis |
| 7,303,265 | B1 | 12/2007 | Delametter et al. |
| 10,011,910 | B2 | 7/2018 | Phillips |
| 2010/0185428 | A1 | 7/2010 | Vink |
| 2016/0310947 | A1 | 10/2016 | Walsh |
| 2017/0198401 | A1 | 7/2017 | Phillips |
| 2019/0012414 | A1* | 1/2019 | Bere .................. G06F 30/23 |
| 2019/0280561 | A1 | 9/2019 | Abramov |
| 2020/0334347 | A1 | 10/2020 | Hoyos et al. |
| 2021/0272346 | A1 | 9/2021 | Stomakhin et al. |
| 2021/0279385 | A1 | 9/2021 | Stomakhin et al. |

OTHER PUBLICATIONS

Lenaerts T, Adams B, Dutré P. Porous flow in particle-based fluid simulations. ACM Transactions on Graphics (TOG). Aug. 1, 2008; 27(3):1-8.*

Yu J, Turk G. Reconstructing surfaces of particle-based fluids using anisotropic kernels. ACM Transactions on Graphics (TOG). Feb. 7, 2013;32(1):1-2.*

Anderson, et al., Fluid Mechanical Description of Fluidized Beds, Equations of Motion, Indust. & Eng. Chem. Fund., 6(4):527-539, Nov. 1967.

Batty, et al., A Fast Variational Framework for Accurate Solid-Fluid Coupling, ACM Trans. Graph., 26(3), Jul. 2007.

Daviet, et al., Simulation of Drucker-Prager Granular Flows Inside Newtonian Fluids, Working paper or preprint, Feb. 2017.

Gualtieri, et al., Fluid Meeh, of Env. Int., Chapters 1, 6, 7, 8, and 10, Feb. 2008.

Jones, et al., Physically-Based Droplet Interaction, in Proc. of the ACM SIGGRAPH / Eur. Symp. on Comp. Anim., SCA, New York, NY, USA, 2017.

Boek, Edo S. et al., "Lattice Boltzmann simulation of the flow of non-Newtonian fluids in porous media", International Journal of Modem Physics B. Jan. 20, 2003; 17(01n02):99-102.

Aquelet, Nicolas et al., "Porous parachute modelling with an Euler-Lagrange coupling", European Journal of Computational Mechanics/ Revue Europeenne de Mecanique Numerique. Jan. 1, 2007; 16(3-4):385-99.

Fei, Yun (Raymond), "A multi-scale model for simulating liquid-fabric interactions", ACM Transactions on Graphics (TOG) Jul. 30, 2018;37(4):1-6.

Martin, Tobias e tal. "A Lagrangian approach for the coupled simulation of fixed net structures in a Eulerian fluid model", Journal of Fluids and Structures, 94 (2020).

Oh et al., "Single-Phase Trapped Air Simulation in Water Flow," (2014) WSCG: Full Papers Proceedings: 22nd International Conference in Central Europe on Computer Graphics, Visualization and Computer Vision in co-operation with EUROGRAPHICS Association, p. 87-94.

International Search Report dated Jun. 21, 2021 in PCT Application No. PCT/NZ2021/050028.

Boutt et al., "Direct Simulation of Fluid-solid Mechanics in Porous Media Using Discrete Element and Lattice-Boltzmann Methods," (2007) Journal of Geophysical Research 112(B10), p. 1-13.

Stomakhin et al., "Underwater Bubbles and Coupling," (Aug. 2020) SIGGRAPH '20, p. 1-2.

Blunt et al., "Pore-scale Imaging and Modelling," (2013) Advances in Water Resources 51:197-216.

Ovaysi et al., "Direct Pore-level Modeling of Incompressible Fluid Flow in Porous Media," (2010) Journal of Computational Physics 229:7456-7476.

Yun et al., "A Multi-Scale Model for Simulating Liquid-Fabric Interactions," (2018) ACM Transactions on Graphics 37 (4):Article 51, p. 1-16.

* cited by examiner

METHOD FOR SIMULATING FLUIDS INTERACTING WITH SUBMERGED POROUS MATERIALS

CROSS-REFERENCE TO RELATED APPLICATIONS

This application is a continuation of U.S. application Ser. No. 17/184,299, filed Feb. 24, 2021, which is incorporated by reference in its entirety for all purposes, and claims the benefit of U.S. Provisional Application No. 62/983,250 filed on Feb. 28, 2020, which is incorporated by reference in its entirety for all purposes.

FIELD OF THE INVENTION

The present disclosure generally relates to modeling porous media submerged in fluid and more particularly to efficient computation for simulation of porous media submerged in fluid.

BACKGROUND

Visual representations of scenes intended to reflect real-world scenarios are common in animation and other fields. For example, a computer-generated imagery scene could be created by having an artist manually draw a sequence of frames to form a video sequence. For simple cartoons, for example, this is a feasible approach. However, as viewers have come to expect more complex visuals, there is a need for computer-driven imagery generation. Some of that computer-driven imagery generation might rely on simulation.

Computer simulation that is used for imagery generation has been used to animate natural movements of characters, such as by using a physics engine to output movements of an articulated character that are consistent with real-world physics and joint constraints. In some ways, this is often a simple problem—how to determine natural-looking movements of at most a few dozen attached body parts. For other simulations, such as with flexible objects, fluids, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources. Simulation computations involving porous materials (such as, but not limited to, cloth, hair, bubbles, or sand) submerged in a fluid (such as, but no limited to, air or water) can often involve such trade-offs.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a computer simulation involving three dimensions and having an output that is imagery (such as a still image or a sequence of video frames), often the virtual objects and material being simulated are represented relative to a three-dimensional ("3D") grid in a virtual space with the grid being divided into voxels. Some elements might have sub-voxel resolution. Many small or thin objects, such as bubbles, hair, and cloth, present in a virtual fluid typically require sub-voxel resolution to be accurately represented in a simulator.

In many of the examples described herein, inputs to a computer simulation system include parameters about the virtual material/object/fluid/etc. being simulated and an output of a computer simulation are the positions/mass/movement/etc. of the virtual material/object/fluid/etc. Such an output might be an input to an animation system, which can provide for rendering computer-generated imagery of the virtual material/object/fluid/etc. present in a scene in a virtual space. The computer-generated imagery might be still images, stereoscopic images, video sequences, and/or stereoscopic video sequences. In some cases, the computer simulation of virtual elements seeks to match what would happen with corresponding real-world elements, but in other cases, artistic or other inputs are used in the computer simulation to create effects that do not correspond to anything in the real-world, or at least anything in available physical environments. For example, in a given simulation, an operator of a simulation engine might provide an input that corresponds to gravity "turning off" for a short period of time, which can be simulated but has no real-world correspondence.

Figure 1:
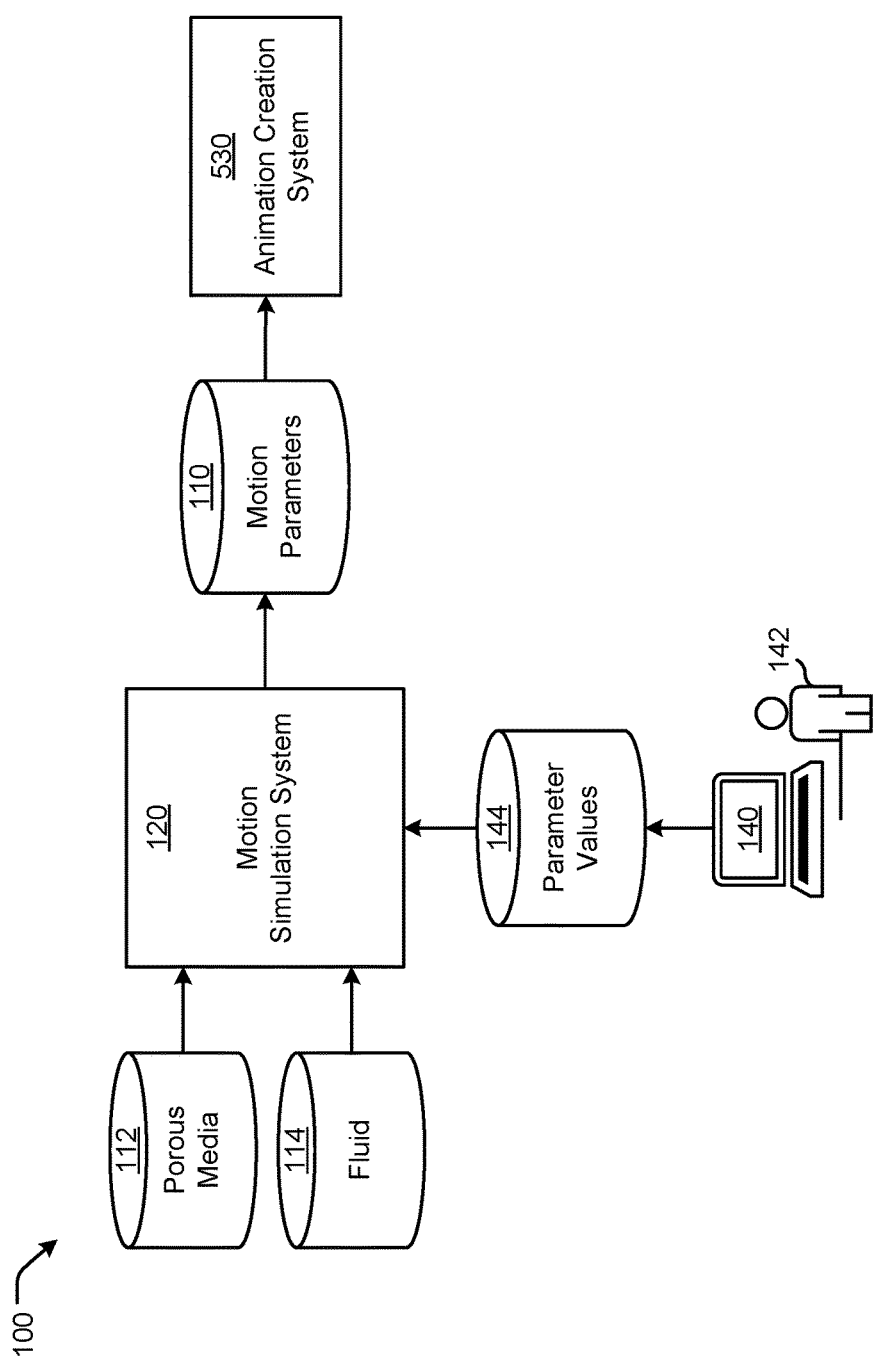
FIG. 1 is a diagram of a data flow through a system when the system is generating values of motion parameters, which are used to create visual representations of a porous media in a fluid.

FIG. 1 is a diagram of a data flow through a system 100 when the system 100 is performing a process 200 (see FIG. 2) that generates values of motion parameters 110, which are used by an animation creation system 430 component of an example visual content generation system 400 (see FIG. 4) to create visual representations of porous media 112 submerged in a fluid 114. Referring to FIG. 3, the porous media 112 includes a plurality of individual objects 300 (e.g., air bubbles, sand, individual hairs, and/or cloth strands) that, in the real world, would move at least partially independently of one another. Therefore, the motion parameters 110 (see FIG. 1) are configured to cause the individual objects 300 to appear to move at least partially independently of one another in a simulation of the porous media 112 submerged in the fluid 114. During the simulation, the fluid 114 flows in between and around the individual objects 300 of the porous media 112. By way of non-limiting examples, the porous media 112 may include bubbles 302 (e.g., diffuse bubbles), hair, foam, sand, sponge, plants, cloth, and the like. For example, the porous media 112 may be diffuse air bubbles and the fluid 114 may be water. The fluid 114 (e.g., water, air, oil, and the like) may have a density that is much larger (e.g., 1000 times) the density of the porous media 112 (e.g., air bubbles).

As used herein, the term "porous medium" describes a medium comprising objects between which a fluid is able to interpenetrate and move. In some cases, the objects are unconstrained relative to one another, such that each object can move independently of the others. This may occur, for example, with granular media such as dust, sand, bubbles, or in other cases where objects of the porous medium are individual particles or can be modeled with particles. This may be thought of as a zero-dimensional constraint, or a constraint on zero degrees of freedom. A one-dimensional constraint, or constraint of a single degree of freedom, may occur for example with hair (e.g., where the objects of the porous medium are hairs), wherein the hairs are free to move relative to one another along most of their lengths, but are fixed at one end relative to one another. A two-dimensional constraint or two-degree-of-freedom constraint may for example occur with cloth, wherein the objects of the porous medium are interwoven fibers that are free to move, bend, or fold in three dimensions but have fixed locations relative to one another within the topological plane of the cloth. A three-dimensional constraint or three-degree-of-freedom constraint can occur for example with a three-dimensional network such as a sponge, wherein the objects of the porous medium are fibers or other shapes that intertwine in three dimensions. A sponge may be capable of bending or flexing, but the objects making up the sponge have fixed spatial relationships to one another within the topological volume of the sponge.

Referring to FIG. 1, the system 100 is shown including a motion simulation system 120 and at least one client computing device 140 operated by at least one human artist 142. The motion simulation system 120 may be implemented by software executing on one or more computer systems (e.g., each like a computer system 500 illustrated in FIG. 5). The motion simulation system 120 is configured to receive data defining the porous media 112 and data defining the fluid 114 and output the values of the motion parameters 110. The values of the motion parameters 110 may include the data defining the porous media 112 and the data defining the fluid 114. The values of the motion parameters 110 may be generated based at least in part on parameter values 144 that may include parameter values defined by the artist 142 (e.g., using the client computing device 140) and/or parameter values that are predetermined and stored in a data store. When the parameter values 144 include user-defined parameter values, the motion of the porous media 112 may be characterized as being at least partially art directable.

As described below, the visual content generation system 400 (see FIG. 4) is configured to receive the values of the motion parameters 110 as input and output one or more static images and/or one or more animated videos. The static image(s) and/or the animated video(s) include one or more visual representations of the porous media 112 in the fluid 114. The visual content generation system 400 may transmit the static image(s) and/or the animated video(s) to the client computing device 140 for display to the artist 142. The artist 142 may use the static image(s) and/or the animated video(s) to view the visual representations of the porous media 112 in the fluid 114 and make adjustments to the parameter values 144. Then, the motion simulation system 120 may output new values of the motion parameters 110, which the visual content generation system 400 may use to output new versions of the static image(s) and/or the animated video(s) that may be viewed by the artist 142 on the client computing device 140. This process may be repeated until the artist 142 is satisfied with the appearance of the porous media 112 in the fluid 114.

As mentioned above, the client computing device 140 is configured to communicate with the motion simulation system 120. For example, the artist 142 may use the client computing device 140 to specify the parameter values 144 to the motion simulation system 120. Optionally, the motion simulation system 120 may be configured to display the porous media 112, the fluid 114, and/or the porous media 112 in the fluid 114 to the artist 142 on the client computing device 140 so that the artist 142 may adjust the parameter values 144 as desired before the values of the motion parameters 110 are input into the visual content generation system 400. As mentioned above, the client computing device 140 is configured to receive the static image(s) and/or the animated video(s) from the visual content generation system 400 (see FIG. 4) and display the static image(s) and/or the animated video(s) to the artist 142 so that the artist 142 may adjust the parameter values 144. The client computing device 140 may be implemented using the computer system 500 illustrated in FIG. 5.

As mentioned above, the motion simulation system 120 may be used to model the motion of submerged porous materials (e.g., the porous media 112 submerged in the fluid 114). For example, the fluid 114 may be modeled within a sparse domain around the submerged porous media 112. To prevent the fluid 114 from having an apparent sliding effect with respect to invisible boundaries and also to avoid dealing with null-modes in the Poisson pressure solve, the motion simulation system 120 may enforce a hydrostatic pressure boundary condition, as opposed to a flux velocity boundary condition, on the outside of the narrow band, which may be expressed as p_hydrostatic(h)=$\rho_w$gh, where a variable "h" represents an evaluation height, a variable "$\rho_w$" represents the density of the fluid 114, and a variable "g" represents the acceleration of gravity. When the submerged porous media 112 is a collection of small bubbles, the motion simulation system 120 (see FIG. 1) may generate additional bubble particles based on an "air bubble entrainment" metric described in C. Gualtieri, D. Mihailovic, H. Chanson, B. Cushman-Roisin, G. Doria, P. Gualtieri, G. Kallos, J. Ackerman, and B. Rajkovic, *Fluid Mech. of Env. Int*, Febuary 2008, to enhance the look of turbulent regions.

Figure 2:
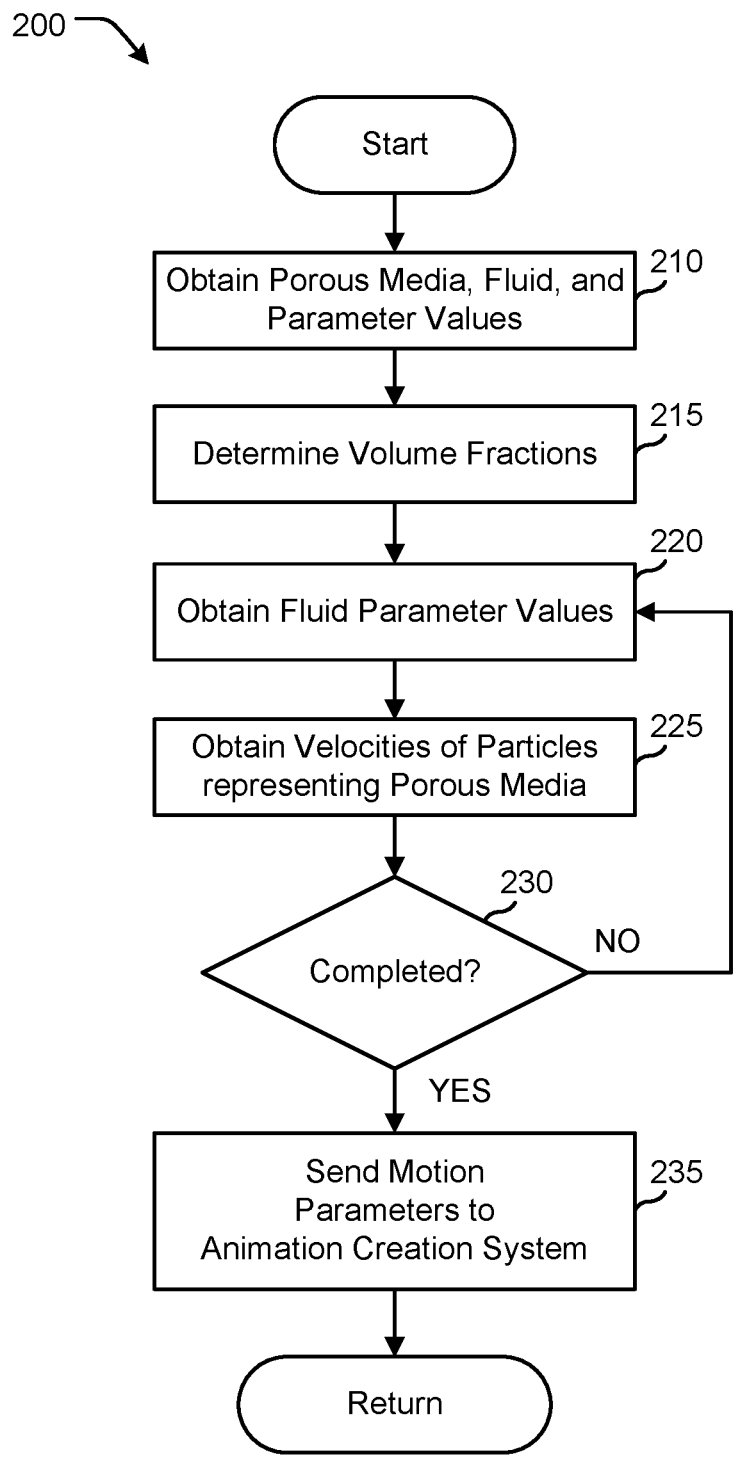
FIG. 2 is a flowchart of the process of generating the values of the motion parameters.
Figure 3:
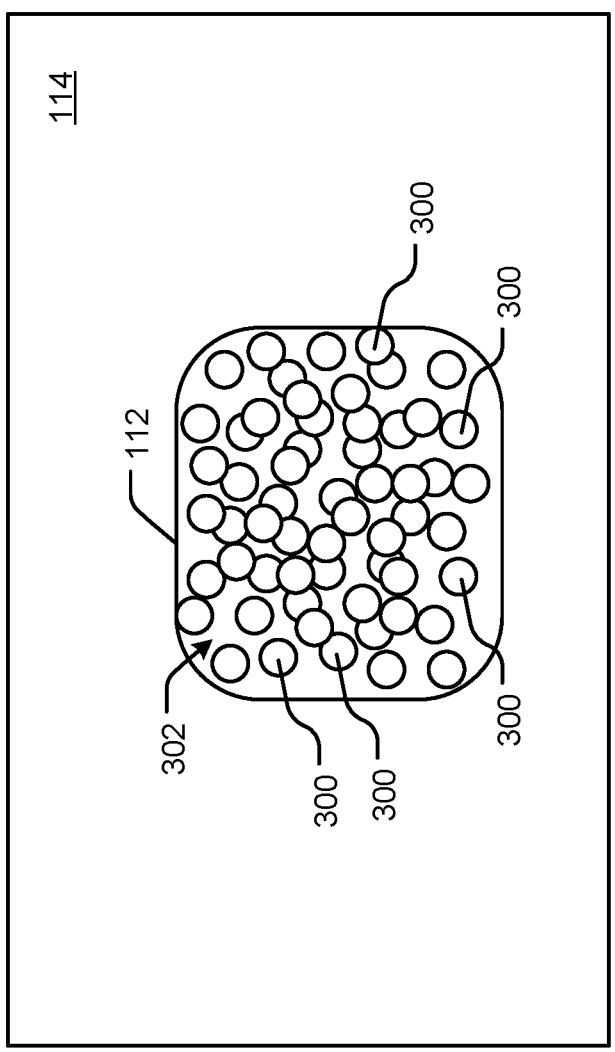
FIG. 3 shows an example porous media submerged in an example fluid.

FIG. 2 is a flowchart of the process 200 that may be executed by the system 100 of FIG. 1 and used to generate the values of those of the motion parameters 110 that govern the motion of the individual objects 300 (e.g., the bubbles 302). The process 200 captures sub-grid motion potentially not "seen" by the Eulerian grid used to model the fluid 114. While performing the process 200 (see FIG. 2), the motion simulation system 120 (see FIG. 1) represents the porous media 112 as particles (and possibly edges and 2D polygons connecting them) and couples those particles with the bulk fluid 114. When the porous media 112 is the bubbles 302 (see FIG. 3), the particles may accurately capture sub-grid dynamics, unlike previous methods that used similar particles as trackers to modify effective density and/or expansion of the fluid 114. The motion simulation system 120 (see FIG. 1) assigns a velocity to each of the individual objects 300 (e.g., the sub-grid bubbles 302) and couples the individual objects 300 with the bulk fluid 114 through buoyancy and drag forces. The process 200 may be characterized as being equivalent to "passive advection+density adjust" (or a so-called Boussinesq approximation) in the limit of infinite drag when the porous media 112 is the bubbles 302 (see FIG. 3).

Referring to FIG. 2, in first block 210, the motion simulation system 120 (see FIG. 1) obtains the data defining the porous media 112, the data defining the fluid 114, and the parameter values 144. By way of a non-limiting example, referring to FIG. 1, the fluid 114 may be provided to the motion simulation system 120 as a 3D model of a bulk fluid. The porous media 112 may be provided to the motion simulation system 120 as 3D model, a procedural model, and the like. The motion simulation system 120 (see FIG. 1) generates a grid or field representing the fluid 114 and a plurality of particles representing the individual objects 300. The field is configured to store fluid parameter values with respect to the fluid 114. For example, the field has a plurality of field locations each corresponding to a fluid location within the fluid 114. The field is configured to store at least one fluid parameter value in each field location that applies to the fluid in the corresponding fluid location. By way of non-limiting examples, the fluid parameter values may include fluid velocity values, pore pressures, and the like. The individual objects 300 may be modeled as Lagrangian particles and the fluid 114 may be modeled as an Eulerian bulk fluid (defined on an Eulerian grid with the fluid parameter values). The motion simulation system 120 uses a continuum approach to model interactions between the porous media 112 (e.g., the bubbles 302) and the fluid 114.

Referring to FIG. 2, in block 215, the motion simulation system 120 determines a first volume fraction for the porous media 112 and a second volume fraction for the fluid 114. A variable "$\phi_b$" represents a volume of the porous media 112 and a variable "$\phi_w$" represents a volume of the fluid 114 (e.g., water). The values of the variables "$\phi_b$" and "$\phi_w$" may be scaled to total one so that the variable "$\phi_b$" and an expression "$\phi_w=1-\phi_b$" represent volume fractions of the porous media 112 and the fluid 114, respectively.

Referring to FIG. 2, in block 220, the motion simulation system 120 obtains the fluid parameter values. For example, in block 220, the motion simulation system 120 may obtain the pore pressure and the fluid velocity values for the fluid 114. The motion simulation system 120 may obtain the pore pressure and the fluid velocity values by assuming the particles representing the porous media 112 have prescribed velocities (e.g., zero) and solving a system of equations that includes Equations 5-7 below for the pore pressure and the fluid velocity values of the fluid 114. By way of a non-limiting example, a fluid solver may be used to solve the system of equations for the pore pressure and the fluid velocity values of the fluid 114.

The internal pressures of the fluid 114 and the porous media 112 may be written as fractions of the pore pressure, which is represented by a variable "p." The internal pressure of the porous media 112 may be written as an expression "$\phi_b p$" and the internal pressure of the fluid 114 may be written as an expression "$\phi_w p$." Example methods of calculating the pore pressure (represented by the variable "p") are provided by T. B. Anderson and R. Jackson, *Fluid mechanical description of fluidized beds, equations of motion*, Indust. & Eng. Chem. Fund., 6(4):527-539, November 1967, and G. Daviet and F. Bertails-Descoubes, *Simulation of Drucker—Prager granular flows inside Newtonian fluids*, Working paper or preprint, February 2017.

A force per unit volume exerted by the fluid 114 (e.g., water) on the porous media 112 (e.g., diffuse air bubbles) is a sum of a generalized buoyancy contribution, which is represented by Equation 1 below, and a drag term, which is represented by Equation 2 below. In Equation 2, a variable "$\zeta$" represents a drag coefficient, which may be non-uniform. A variable "$u_w$" represents a velocity of the fluid and a variable "$u_b$" represents a velocity of the porous media 112.

$$f_{w \rightarrow b}^{buo} = \phi_w \nabla(\phi_b p) - \phi_b \nabla(\phi_w p) = p \nabla \phi_b \quad \text{(Eqn. 1)}$$

$$f_{w \rightarrow b}^{drag} = \zeta(|u_w - u_b|)(w_w - u_b) \quad \text{(Eqn. 2)}$$

The conservation of momentum equation for the fluid 114 (e.g., water) is Equation 3 below and the conservation of momentum equation for the porous media 112 is Equation 4 below. In Equations 3 and 4, a variable "t" represents time, a variable "$\rho_w$" represents the density of the fluid 114, a variable "$\rho_b$" represents the density of the porous media 112, and a variable "g" represents the acceleration of gravity.

$$\phi_w \rho_w \frac{Du_w}{Dt} - \phi_w \rho_w g + f_{w \rightarrow b}^{drag} = -f_{w \rightarrow b}^{buo} - \nabla(\phi_w p) \equiv -\phi_w \nabla p \quad \text{(Eqn. 3)}$$

$$\phi_b \rho_b \frac{Du_b}{Dt} - \phi_b \rho_b g - f_{w \rightarrow b}^{drag} = f_{w \rightarrow b}^{buo} - \nabla(\phi_b p) \equiv -\phi_b \nabla p \quad \text{(Eqn. 4)}$$

As mentioned above, the motion simulation system 120 models the porous media 112 as particles. When the fluid fraction (represented by the variable "$\phi_w$") is non-zero and Equation 4 is integrated over a volume of a particle (represented by a varaible "$V_p$"), Equation 5 below for the fluid 114 and Equation 6 below for the particles result. In Equation 6, a variable "$m_p$" represents a mass of a particle and a variable "$u_p$" represents a velocity of the particle.

$$\rho_w \frac{Du_w}{Dt} = \rho_w g - \frac{1}{\phi_w} f_{w \rightarrow b}^{drag} - \nabla p \quad \text{(Eqn. 5)}$$

$$m_p \frac{du_p}{dt} = m_p g + \frac{V_p}{\phi_b} f_{w \rightarrow b}^{drag} - V_p \nabla p \quad \text{(Eqn. 6)}$$

The system is closed by enforcing incompressibility of the mixture, which is expressed by Equation 7 below.

$$\nabla \cdot [\phi_w u_w + \phi_b u_b] = 0 \quad \text{(Eqn. 7)}$$

Thus, a simulation engine might solve a system of equations that includes Equations 5-7 to yield motion of the porous media 112 not "seen" by the Eulerian grid used to model the fluid 114. By adding inter-particle forces and/or constraints, the method may be used to model the motion of thin and/or porous solids, such as hair, plants, cloth, and the like.

Referring to FIG. 2, in block 225, the motion simulation system 120 solves for the velocity of each of the particles representing the porous media 112 using the fluid parameter values obtained for the fluid 114 in block 220. The velocity of each of the particles may be presented as vector that includes a direction of motion.

In decision block 230, the motion simulation system 120 determines whether the simulation has completed. The decision in decision block 230 is "YES," when the motion simulation system 120 determines the simulation has completed. Otherwise, the decision in decision block 230 is "NO." By way of a non-limiting example, blocks 220-230 may be repeated a desired number of iterations (e.g., five times). The number of iterations might be specified by an artist (e.g., the artist 142) or operator in advance.

When the decision in decision block 230 is "NO," the motion simulation system 120 returns to block 220 and recalculates the fluid parameter values for the fluid 114 but, this time, the motion simulation system 120 uses the velocities calculated in block 225 for the prescribed velocities of the particles representing the porous media 112. Thus, in block 220, the system of equations may be solved first for the fluid 114 and the results supplied to the equations for the porous media 112. Then, in block 225, the system of equations for the particles representing the porous media 112 may be solved. When the decision in decision block 230 is "NO," the solutions obtained for the particles may be supplied to the equations for the fluid 114. This process may be repeated for the desired number of iterations (e.g., for five iterations).

Blocks 220-230 may be characterized as discretizing the solutions to the system of equations. The motion simulation system 120 may couple the porous media 112 and the bulk fluid 114 together weakly (e.g., iteratively rather than via closed-form equations), which allows the simulation to benefit from an efficient solver for the fluid 114 and a different efficient solver for the porous media 112. This becomes especially useful for more complicated submerged porous materials, such as cloth and hair, because they may exhibit non-trivial elastic responses. The motion simulation system 120 may step forward in time frame-by-frame. Within each frame, the motion simulation system 120 may perform one or more Newton iterations or steps. Within each Newton step of the fluid solver, the motion simulation system 120 may perform a Poisson projection to obtain the fluid velocity (or the field of fluid velocity values) and the pore pressure (represented by the variable "p") assuming the prescribed velocities of the particles. Then, the motion simulation system 120 may solve for the velocities of particles by using and fixing the fluid velocity values and the pore pressure. The individual objects 300 may be modeled as Lagrangian particles interacting with the Eulerian bulk fluid (defined on an Eulerian grid) through buoyancy and drag. Splatting/rasterization and/or interpolation may be used to transfer the particles to and from the Eulerian grid.

The drag force on the particles is calculated from the surrounding fluid velocity. The drag force may be rasterized on the Eulerian grid as a negative force term (e.g., having a minus sign), and added to the velocity of the bulk fluid. Typically, a linear drag model is used when fluid flow around bubbles can be considered laminar. But, instead, a quadratic drag force term may be used to create more realistic dynamics. Due to the non-linearity, an implicit treatment of the rasterized drag within the Poisson pressure solve may be used to achieve good convergence results.

The particle buoyancy force may be calculated by multiplying the surrounding fluid pressure gradient and particle volume. The individual objects 300 in turn affect the bulk fluid through rasterized to voxel faces volume fractions and velocities, similar to collision objects in a standard variational Pressure projection solve. See e.g., C. Batty, F. Bertails, and R. Bridson. *A fast variational framework for accurate solid-fluid coupling*, ACM Trans. Graph., 26(3), July 2007.

The process 200 may be employed as post-processing technique on top of an existing fluid simulation without any porous material (e.g., bubbles). When the pressure values from the existing simulation are used as a boundary condition on the sparse fluid domain, the submerged the porous media 112 is the bubbles 302 (see FIG. 3), and the "air bubble entrainment" metric is used to emit additional bubbles, the motion simulation system 120 may achieve believable results.

To get the bubbles 302 to merge, methods such as those described in R. Jones and R. Southern, *Physically-based droplet interaction*, In Proc. of the ACM SIGGRAPH/Eur. Symp. on Comp. Anim., SCA, New York, N.Y., USA, 2017. ACM, may be used.

When the decision in decision block 230 is "YES," in block 235, the motion simulation system 120 forwards the values of the motion parameters 110 to the animation creation system 430 (see FIGS. 1 and 4) component of the visual content generation system 400 (see FIG. 4), which uses the values of the motion parameters 110 to create visual representations of the porous media 112 submerged in the fluid 114. Then, the process 200 terminates.

Figure 4:
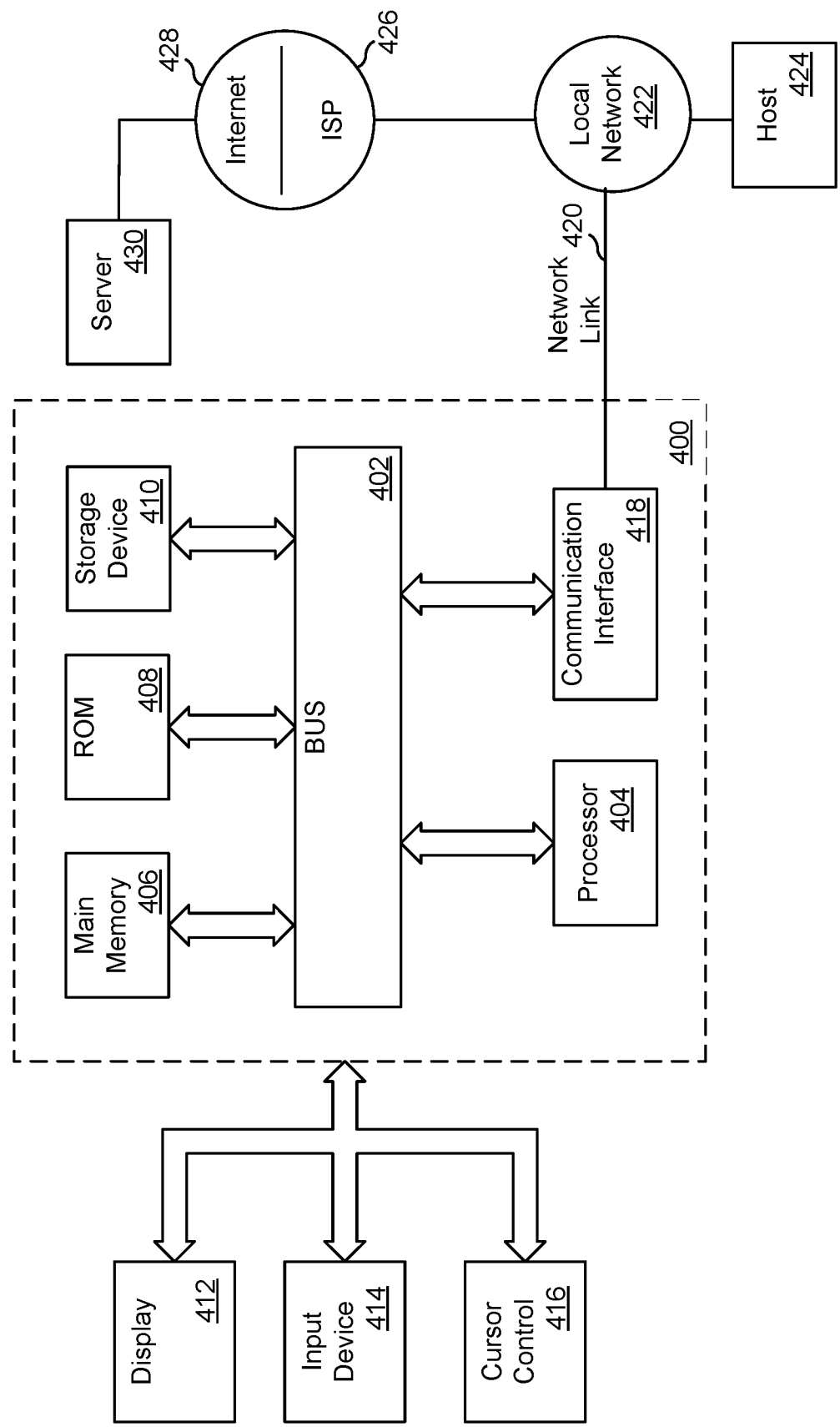
FIG. 4 illustrates an example visual content generation system as might be used to generate imagery in the form of still images and/or video sequences of images.

For example, FIG. 4 illustrates the example visual content generation system 400 as might be used to generate imagery in the form of still images and/or video sequences of images. Visual content generation system 400 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 142 illustrated in FIG. 1) and might use visual content generation system 400 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 142 illustrated in FIG. 1) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 4, a live action capture system 402 captures a live scene that plays out on a stage 404. Live action capture system 402 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 406(1) and 406(2) capture the scene, while in some systems, there might be other sensor(s) 408 that capture information from the live scene (e.g., infrared cameras, infrared sensors, motion capture ("mo-cap") detectors, etc.). On stage 404, there might be human actors, animal actors, inanimate objects, background objects, and possibly an object such as a green screen 410 that is designed to be captured in a live scene recording in such a way that it is easily overlaid with computer-generated imagery. Stage 404 might also contain objects that serve as fiducials, such as fiducials 412(1)-(3), that might be used post-capture to determine where an object was during capture. A live action scene might be illuminated by one or more lights, such as an overhead light 414.

During or following the capture of a live action scene, live action capture system 402 might output live action footage to a live action footage storage 420. A live action processing system 422 might process live action footage to generate data about that live action footage and store that data into a live action metadata storage 424. Live action processing system 422 might include computer processing capabilities, image processing capabilities, one or more processors, program code storage for storing program instructions executable by the one or more processors, as well as user input devices and user output devices, not all of which are shown. Live action processing system 422 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 414, as that might be useful in post-processing to match computer-generated lighting on objects that are computer-generated and overlaid on the live action footage. Live action processing system 422 might operate autonomously, perhaps based on predetermined program instructions, to generate and output the live action metadata upon receiving and inputting the live action footage. The live action footage can be camera-captured data as well as data from other sensors.

An animation creation system 430 is another part of visual content generation system 400. Animation creation system 430 might include computer processing capabilities, image processing capabilities, one or more processors, program code storage for storing program instructions executable by the one or more processors, as well as user input devices and user output devices, not all of which are shown. Animation creation system 430 might be used by animation artists, managers, and others to specify details, perhaps programmatically and/or interactively, of imagery to be generated. From user input and data from a database or other data source, indicated as a data store 432, animation creation system 430 might generate and output data representing objects (e.g., a horse, a human, a ball, a teapot, a cloud, a light source, a texture, etc.) to an object storage 434, generate and output data representing a scene into a scene description storage 436, and/or generate and output data representing animation sequences to an animation sequence storage 438.

Scene data might indicate locations of objects and other visual elements, values of their parameters, lighting, camera location, camera view plane, and other details that a rendering engine 450 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 430 might be interactive, allowing a user to read in animation sequences, scene descriptions, object details, etc. and edit those, possibly returning them to storage to update or replace existing data. As an example, an operator might read in objects from object storage into a baking processor 442 that would transform those objects into simpler forms and return those to object storage 434 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 432 might be used to drive object presentation. For example, if an artist is creating an animation of a spaceship passing over the surface of the Earth, instead of manually drawing or specifying a coastline, the artist might specify that animation creation system 430 is to read data from data store 432 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 444 might read in live action metadata, such as data representing movements and positions of body parts of a live actor during a live action scene. Animation driver generator 444 might generate corresponding animation parameters to be stored in animation sequence storage 438 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 422. Animation driver generator 444 might convert that movement data into specifications of how joints of an articulated CGI character are to move over time.

A rendering engine 450 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 450 might include computer processing capabilities, image processing capabilities, one or more processors, program code storage for storing program instructions executable by the one or more processors, as well as user input devices and user output devices, not all of which are shown.

Visual content generation system 400 can also include a merging system 460 that merges live footage with animated content. The live footage might be obtained and input by reading from live action footage storage 420 to obtain live action footage, by reading from live action metadata storage 424 to obtain details such as presumed segmentation in captured images segmenting objects in a live action scene from their background (perhaps aided by the fact that green screen 410 was part of the live action scene), and by obtaining CGI imagery from rendering engine 450.

A merging system 460 might also read data from rulesets for merging/combining storage 462. A very simple example of a rule in a ruleset might be "obtain a full image including a two-dimensional pixel array from live footage, obtain a full image including a two-dimensional pixel array from rendering engine 450, and output an image where each pixel is a corresponding pixel from rendering engine 450 when the corresponding pixel in the live footage is a specific color of green, otherwise output a pixel value from the corresponding pixel in the live footage."

Merging system 460 might include computer processing capabilities, image processing capabilities, one or more processors, program code storage for storing program instructions executable by the one or more processors, as well as user input devices and user output devices, not all of which are shown. Merging system 460 might operate autonomously, following programming instructions, or might have a user interface or programmatic interface over which an operator can control a merging process. In some embodiments, an operator can specify parameter values to use in a merging process and/or might specify specific tweaks to be made to an output of merging system 460, such as modifying boundaries of segmented objects, inserting blurs to smooth out imperfections, or adding other effects. Based on its inputs, merging system 460 can output an image to be stored in a static image storage 470 and/or a sequence of images in the form of video to be stored in an animated/combined video storage 472.

Thus, as described, visual content generation system 400 can be used to generate video that combines live action with computer-generated animation using various components and tools, some of which are described in more detail herein. While visual content generation system 400 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 5:
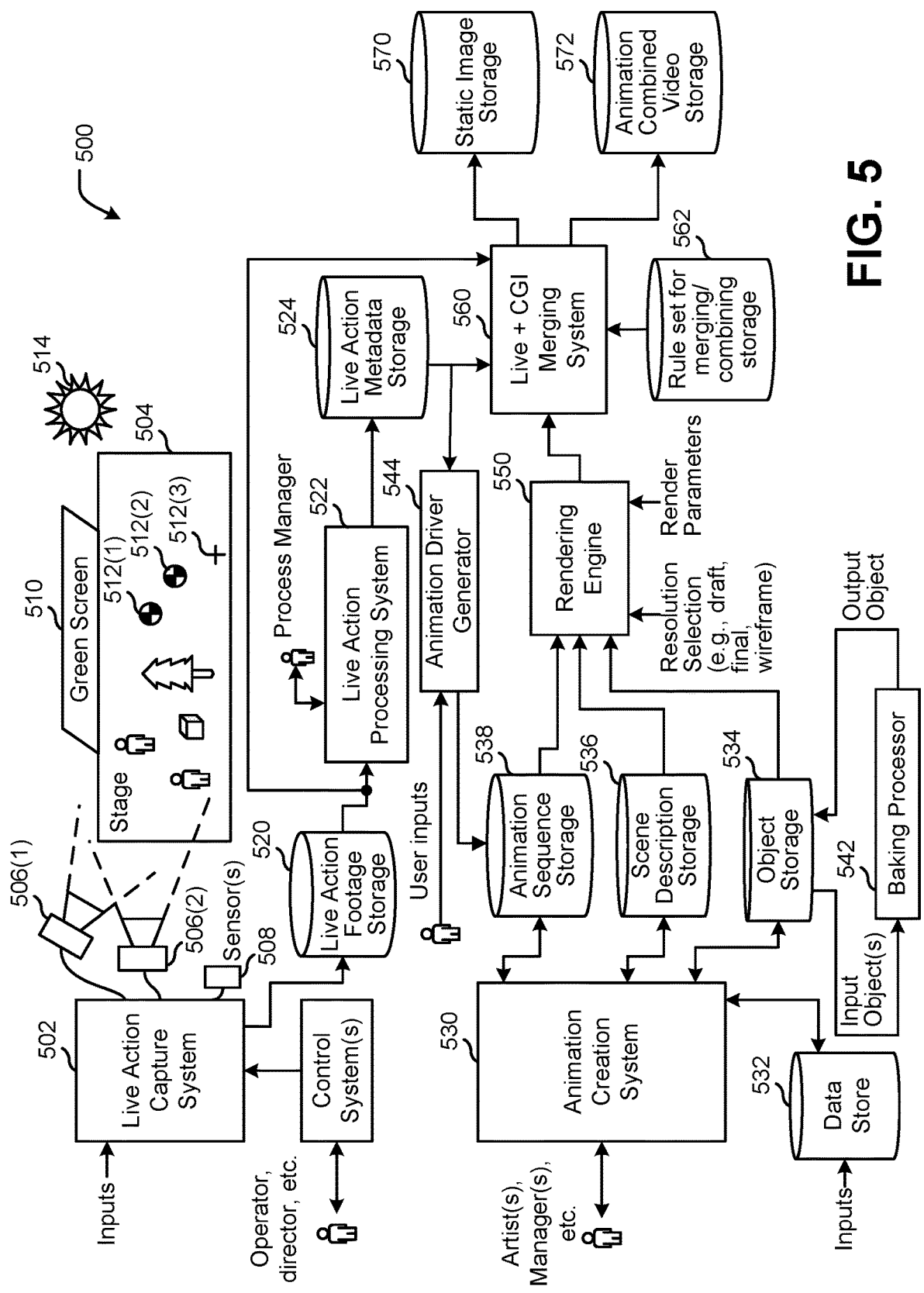
FIG. 5 is a block diagram illustrating an example computer system upon which computer systems of the systems illustrated in FIGS. 1 and 4 may be implemented.

For example, FIG. 5 is a block diagram that illustrates a computer system 500 upon which the computer systems of the systems described herein and/or visual content generation system 400 (see FIG. 4) may be implemented. Computer system 500 includes a bus 502 or other communication mechanism for communicating information, and a processor 504 coupled with bus 502 for processing information. Processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 may also be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a computer monitor, for displaying information to a computer user. An input device 514, including alphanumeric and other keys, is coupled to bus 502 for communicating information and command selections to processor 504. Another type of user input device is a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a network connection. A modem or network interface local to computer system 500 can receive the data. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be a network card, a modem, a cable modem, or a satellite modem to provide a data communication connection to a corresponding type of telephone line or communications line. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through the Internet 528, ISP 526, local network 522, and communication interface 518. The received code may be executed by processor 504 as it is received, and/or stored in storage device 510, or other non-volatile storage for later execution.

Figure 6:
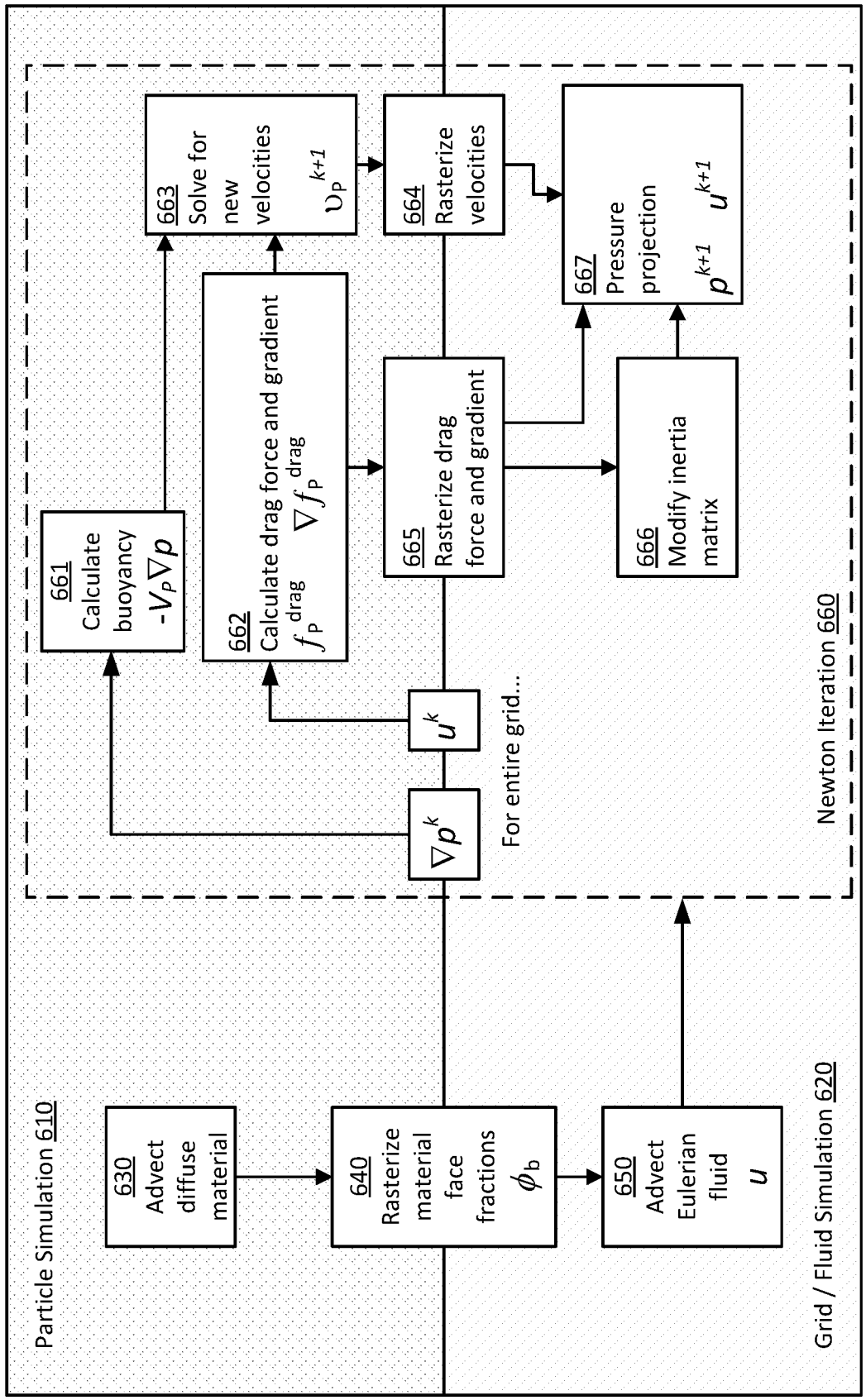
FIG. 6 is a block diagram that illustrates a motion simulation system featuring weak coupling or iterative coupling between a particle simulation and a grid or fluid simulation.

FIG. 6 is a block diagram that illustrates a motion simulation system 120 featuring weak coupling or iterative coupling between a particle simulation 610 and a grid or fluid simulation 620. In step 630, the particle simulation 610 advects the diffuse material or porous medium (e.g., by moving the diffuse material or porous medium in three dimensions). The diffuse material or porous medium may for example comprise a plurality of objects coupled together in zero, one, two, or three degrees of freedom, as described above, and may be advected via a Lagrangian particle simulation.

In step 640, the particle simulation permits the diffuse material or porous medium to displace portions of the fluid, by rasterizing the material face fractions $\phi_b$ (e.g., by mapping the object faces to the voxel grid of the fluid simulation 620) as described above.

In step 650, the fluid simulation advects the fluid u (e.g., moves the fluid in three dimensions) via an Eulerian grid simulation of the velocities and pore pressures at each point in the grid.

Results from both the particle simulation 610 and the grid or fluid simulation 620 are then handed off to a Newtonian iteration process 660.

In the Newtonian iteration process 660, the pore pressure values and velocity vectors for the entire grid (e.g., for each point in the grid) are used as the basis for additional calculations.

In step 661, buoyancy values are calculated for each particle.

In step 662, the drag force and drag force gradient are calculated for each particle.

In step 663, the buoyancy, drag force, and drag force gradient are used to calculate new velocity vectors for each particle.

In step 664, the velocity vectors for each particle are rasterized (e.g., translated into the voxel grid coordinates of the fluid simulation 620).

In step 665, the drag force and drag force gradients for each particle are rasterized (e.g., translated into the voxel grid coordinates of the fluid simulation 620).

In step 666, the inertia matrix of the fluid simulation is modified, based on the rasterized drag forces and drag force gradients of the particles (e.g., the movement of the particles now affects the movement of the fluid).

In step 667, new pore pressures p and velocities u are calculated for the fluid simulation grid (e.g., for each point in the grid), using the rasterized particle velocities, the rasterized particle drag forces and drag force gradients, and the modified fluid inertia matrix.

The Newtonian iteration 660 is then repeated until the fluid pressure and velocity values computer in step 667 stop changing (e.g., when the values of p and u for the current iteration, minus the values of p and u for the previous iteration, are smaller than a specified threshold)—a condition that nay be referred to as convergence.

The entire process shown in FIG. 6 may occur for each time point in the motion simulation 120, to accurately and realistically model the interaction between the porous medium and the fluid. In some instances, the process shown in FIG. 6 may be applied to two different solid but interpenetrating materials, such as fur rubbing against cloth cloth, where the fur is modeled by the particle simulation and the cloth is modeled by the grid simulation, or vice-versa. In these instances, either the fur or the cloth may be thought of, for simulation purposes, as a fluid.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Copies of T. B. Anderson and R. Jackson, *Fluid mechanical description of fluidized beds, equations of motion*, Indust. & Eng. Chem. Fund., 6(4):527-539, November 1967, and G. Daviet and F. Bertails-Descoubes, *Simulation of Drucker—Prager granular flows inside Newtonian fluids*, Working paper or preprint, February 2017 are filed herewith and incorporated herein by reference in their entireties.

What is claimed is:

1. A computer-implemented method for generating one or more visual representations of a porous medium submerged in a fluid, the computer-implemented method comprising:
    defining a field comprising fluid parameter values for the fluid, the fluid parameter values comprising fluid velocity values and pore pressures;
    defining a plurality of objects comprising the porous medium at locations within the field; and
    determining a first set of motion parameter values for the fluid based at least in part on the field, the first set of motion parameter values simulating fluid motion and determined using only a grid-based solver based on representations of buoyancy forces and representations of drag forces;
    determining a second set of motion parameter values for the plurality of objects based at least in part on the field, the second set of motion parameter values simulating motion of objects of the plurality of objects and determined using only a particle-based solver different from the grid-based solver based on the representations of the buoyancy forces and the representations of the drag forces; and
    iteratively coupling the plurality of objects to the fluid based on the first set of motion parameter values and the second set of motion parameter values,
    wherein the iterative coupling comprises Newtonian iteration of the particle-based solver and the grid-based solver for:
        a specified number or iterations per time step, or
        until a pressure change or velocity change per iteration falls below a convergence threshold value.

2. The method of claim 1, wherein the objects of the plurality of objects are independently movable with respect to one another.

3. The method of claim 1, wherein movement of the objects of the plurality of objects relative to one another is constrained in one, two, or three degrees of freedom.

4. The method of claim 1, wherein the solver for the fluid is Eulerian and the solver for the plurality of objects is Lagrangian.

5. The method of claim 1, wherein the solver for the porous medium is configured to solve for a velocity value of each object of the plurality of objects by using fixed values of the fluid velocity and pore pressures at each object's locations within the field.

6. The method of claim 1, wherein the solver for the fluid is configured to solve a system of equations to obtain the pore pressures and the fluid velocity values of the fluid at locations within the field.

7. The method of claim 1, wherein the drag forces being used to determine relative motion of the plurality of objects and the fluid comprise a drag force term.

8. The method of claim 1, wherein defining the pore pressure values and the fluid velocity values includes assigning a velocity to each object of the plurality of objects.

9. The method of claim 8, wherein the assigned velocity is zero.

10. The method of claim 1, wherein the porous medium comprises cloth, bubbles, sand, hair, foam, sponge, or plants.

11. The method of claim 1, wherein the fluid comprises water, air, or oil.

12. The method of claim 1, further comprising generating one or more visual representations of at least a portion of the plurality of objects.

13. The method of claim 1, further comprising generating one or more visual representations of at least a portion of the fluid.

14. The method of claim 1, further comprising generating a time sequence of visual representations at least a portion of the plurality of objects submerged in at least a portion of the fluid.

15. A computer system for generating the one or more visual representations of the porous medium submerged in the fluid, the system comprising:
    at least one processor; and
    a computer-readable medium storing instructions, which when executed by the at least one processor, causes the system to carry out the method of claim 1, the method further comprising generating one or more visual representations of the plurality of objects submerged in the fluid based on the values of the motion parameters.

16. A non-transitory computer-readable storage medium storing instructions, which when executed by at least one processor of a computer system, causes the computer system to carry out the method of claim 1.

17. A non-transitory computer-readable medium carrying instructions, which when executed by at least one processor of a computer system, causes the computer system to carry out the method of claim 1.

* * * * *